United States Patent
Yan et al.

(10) Patent No.: US 12,449,606 B2
(45) Date of Patent: Oct. 21, 2025

(54) OPTICAL SIGNAL TRANSMISSION SYSTEM AND METHOD FOR ROTARY JOINTS

(71) Applicant: Shaanxi Zhouyuan Photonics Co., Ltd., Shaanxi (CN)

(72) Inventors: Yan Yan, Shaanxi (CN); Jiayi Zhang, Shaanxi (CN); Yuhan Guo, Shaanxi (CN); Wenhao Ren, Shaanxi (CN); Xinlei Zhao, Shaanxi (CN)

(73) Assignee: SHAANXI ZHOUYUAN PHOTONICS CO., LTD., Shaanxi (CN)

( * ) Notice: Subject to any disclaimer, the term of this patent is extended or adjusted under 35 U.S.C. 154(b) by 285 days.

(21) Appl. No.: 17/773,692

(22) PCT Filed: Jul. 19, 2021

(86) PCT No.: PCT/CN2021/107177
§ 371 (c)(1),
(2) Date: Jun. 13, 2023

(87) PCT Pub. No.: WO2022/188328
PCT Pub. Date: Sep. 15, 2022

(65) Prior Publication Data
US 2023/0305236 A1     Sep. 28, 2023

(30) Foreign Application Priority Data

Mar. 10, 2021 (CN) .............. 202110262613

(51) Int. Cl.
*G02B 6/36* (2006.01)
*H04B 10/40* (2013.01)
*H04B 10/80* (2013.01)

(52) U.S. Cl.
CPC .......... *G02B 6/3604* (2013.01); *H04B 10/40* (2013.01); *H04B 10/801* (2013.01)

(58) Field of Classification Search
CPC .... G02B 6/3604; H04B 10/40; H04B 10/801; H04B 10/803; H04B 10/116
See application file for complete search history.

(56) References Cited

U.S. PATENT DOCUMENTS 4,178,515 A * 12/1979 Tarasevich ........... H04B 10/801
250/551

FOREIGN PATENT DOCUMENTS

| CN | 113067641 A | * | 7/2021 | ......... G02B 19/0085 |
| CN | 113726441 A | * | 11/2021 | ............. A61B 6/035 |

(Continued)

*Primary Examiner* — Leslie C Pascal
(74) *Attorney, Agent, or Firm* — McClure, Qualey & Rodack, LLP

(57) ABSTRACT

The present invention provides an optical signal transmission system and method for rotary joints. The system comprises a hollow cylindrical rotor, a hollow cylindrical stator, a plurality of sets of photodetectors arranged on the inner cylindrical wall of the rotor and the stator respectively, a plurality of optical signal sources and optical signal transmit-receive channels. Light beams emitted from the optical signal sources reach the corresponding photodetectors through the optical signal transmit-receive channels. The corresponding photodetectors convert optical signals into electrical signals. Optical signals are transmitted in the optical signal transmission system for symmetric duplex communication, where there is no distinction between uplink and downlink. The technical proposal provided by the present invention can be easily expanded into an optical signal transmission system for multi-channel duplex communication, which shows reliable communication and long service life without shaft wear of rotary joints and coupling problems in optical fibers.

9 Claims, 2 Drawing Sheets

(56) References Cited

FOREIGN PATENT DOCUMENTS

| GB | 2575761 A | * | 1/2020 | ......... G02B 27/0977 |
| WO | WO-2022217764 A1 | * | 10/2022 | ............. H04B 10/11 |

* cited by examiner

OPTICAL SIGNAL TRANSMISSION SYSTEM AND METHOD FOR ROTARY JOINTS

CROSS REFERENCES TO RELATED APPLICATIONS

The present application claims the priority of the Chinese patent application with the application No. 202110262613.2 and titled "An Optical Signal Transmission System and Method for Rotary Joints" filed with the CNIPA on Mar. 10, 2021, the entire contents of which are incorporated by reference incorporated in the present application.

FIELD OF THE INVENTION

The present application belongs to the field of optical communication, in particular to an optical signal transmission system for rotary joints.

BACKGROUND OF THE INVENTION

The information transmission equipment of rotary joints is generally configured in slip-ring equipment, and also configured in the information transmission of movable joints/lidar of movable joints. The electrical connection between the rotating end and fixed end of slip-ring equipment, as well as its power supply and signal transmission are performed by conductive slip rings. The long-term friction between conductive slip ring contacts and ring body of slip-ring equipment will lead to decreased signal conduction, low reliability and poor electromagnetic interference resistance, which will cause a sharp attenuation of high-speed digital signals transmitted through slip-rings and unreliable communication.

Optical fiber slip-rings are produced by installing optical fiber rotating connectors in traditional conductive rings and flexibly connected in a mechanical pull-plug manner, which are composed of optical fiber collimator, Dove prism, miniature precision shaft system, mechanical connection and adjustment mechanisms. The manufacturing cost of multi-channel optical fiber slip-rings is very high. Optical fiber slip-rings have the following advantages:

(1) Optical signals are transmitted through optical fiber without leakage and electromagnetic interference for long-distance transmission;
(2) Less dust and long life;
(3) Made of stainless steel with small size and light weight;
(4) Low loss (<1.0 dB) and high rotation speed (1000 rpm).

However, due to precise alignment of shafts between multi-channel optical fiber slip-rings, the long-term wear of gears will lead to alignment problems in optical fiber transceiver, which reduces the reliability of information transmission.

At present, the optical signal transmission system of rotary joints has the following deficiencies:

1. Large optical loss in one direction during duplex optical information transmission in space leads to inflexibility in wavelength fixation and asymmetric uplink and downlink in the optical signal transmission system when planning wavelengths for bidirectional beams.
2. Long-term wear of gears will lead to alignment problems in optical fiber transceiver, which will shorten the service life of optical fiber slip-rings.

SUMMARY OF THE INVENTION

In order to overcome the above-mentioned deficiencies in the optical signal transmission system of the rotary joints, an optical signal transmission system of the rotary joints is provided by this application, comprising a hollow cylindrical rotor, a hollow cylindrical stator connected with the rotor through a bearing, a plurality of sets of photodetectors and conditioning circuits arranged in inner surfaces of the rotor and the stator respectively, two sets of identical beam-condensing light paths comprising hollow cones and condenser lens, a plurality of optical signal sources, two identical beam splitter and two trays: opposing surfaces of the two trays respectively fixed in internal spaces of the stator and the rotor form an optical signal transmission space with the internal surfaces of the stator and the rotor.

beam-condensing light paths are arranged in a center of a side of either tray facing the other tray, two sets of beam-condensing light paths are symmetric about a certain circular cross-section in the optical signal transmission space: the optical signal sources and the beam splitter are arranged in a center of the other side of the tray, and the beam splitter is fixedly connected to either of the trays: optical signals emitted from the optical signal sources on either tray are combined into a light beam by the beam splitter arranged on the tray, and then the beam is condensed by the condenser lens arranged in an interior of a hollow cone of the beam-condensing light path on the tray to obtain a hollow beam which is received and converted into an electrical signal by the corresponding photodetector and the corresponding conditioning circuit after being reflected from an outer surface of the cone on the other tray Optionally, in the above optical signal transmission system, each of the optical signal sources comprises a light source, an electro-optical modulator, and a beam collimating/shaping system, the electro-optical modulators are provided to modulate carrier beams emitted from the light source with electrical signal data to be transmitted, the beam collimating/shaping systems are provided to collimate modulated beams to reduce the beam divergence angle.

Optionally, in the above optical signal transmission system, each of the hollow cones is a metal structure, which has a metal-coated outer surface with high reflectivity, and a blackening-treated inner surface. The hollow cone is connected to the tray with an opening arranged respectively at its top and bottom, and its central axis and the central axis of the condenser lens fixed on the opening of its top are on the same straight line.

Optionally, in the above optical signal transmission system, the beam splitter arranged on either of the trays is fixed on the tray, and aligned with an center of the bottom surface of the hollow cone in the beam-condensing light path on either tray.

Optionally, in the above optical signal transmission system, the photodetectors and conditioning circuits are configured to condense optical signals and convert the optical signals into electrical signals for amplification processing; and each of the photodetectors and conditioning circuits comprises a focusing lens, an integrated photodetector, a filter at a front end of the focusing lens and an electrical signal conditioning circuit.

Optionally, in the above optical signal transmission system, a number of the optical signal sources on each of the trays is one or more, the number of the optical signal sources on each of the two trays is the same, and the optical signal sources are symmetrically arranged about a certain circular cross section in the optical signal transmission space: light beams emitted from the optical signal sources on the same tray are combined into one beam of light by the beam splitter on the tray, and the beam is positioned at the hollow core of the hollow cone on the tray and is incident on the focusing lens on the tray: after passing through the optical signal transmission space, an outer surface of the hollow cone on the other tray is reflected to form a circular light beam which are received by the photodetectors and conditioning circuits on the other side of the tray.

Optionally, in the above optical signal transmission system, the two optical signal sources emit light beams with different wavelengths.

Optionally, in the above optical signal transmission system, the optical signal transmission system is an optical signal transmission system with multiple transceiver channels.

The present application also provides an optical signal transmission method for rotary joints, through which signal beams are generated by the optical signal sources in the optical signal transmission system, and the signal beams are sent, transmitted and received between the rotor and the stator.

BRIEF DESCRIPTION OF THE DRAWINGS

In order to describe the technical solutions of the present application more clearly, the accompanying drawings that need to be configured will be briefly introduced below. It should be understood that the following drawings only describe some embodiments of the present application, and therefore should not be viewed as limiting the scope.

DETAILED DESCRIPTION OF PREFERRED EMBODIMENTS

Exemplary embodiments of the present application will be described below in more detail with reference to the accompanying drawings. Although the drawings show the exemplary embodiments of the present application, it should be understood that the present application may be implemented in various forms, and should not be limited to the embodiments described herein. Rather, these embodiments are provided so that the present application will be more thoroughly understood, and the scope of the present application will be fully communicated to those skilled in the art. It should be noted that the embodiments of the present application and the features of the embodiments may be combined with each other under the condition of no conflict. The present application will be described in detail below with reference to the accompanying drawings and in conjunction with the embodiments thereof.

Figure 1:
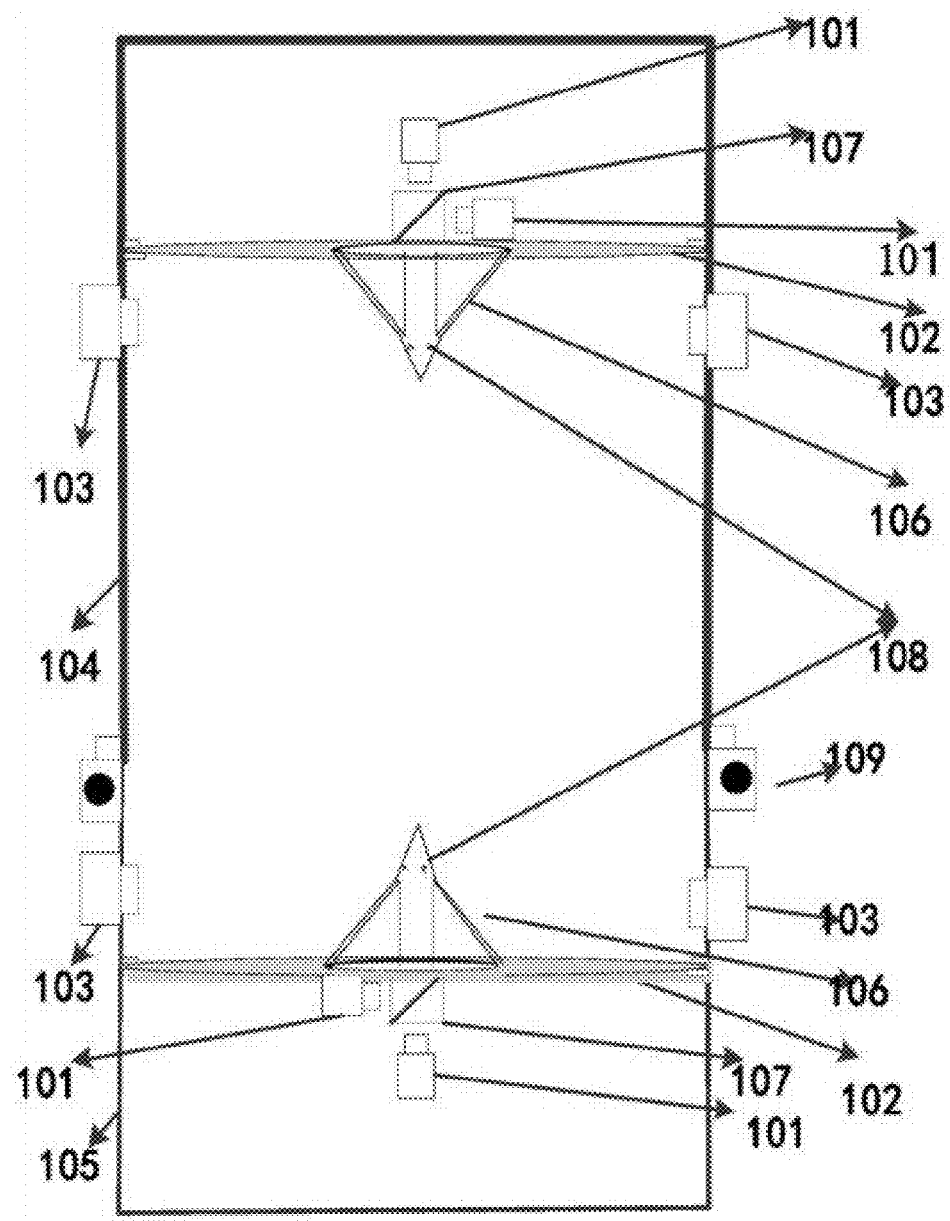
FIG. 1 is a structure diagram of the optical signal transmission system for rotary joints in one embodiment of the present application.

FIG. 1 is a structure diagram of the optical signal transmission system for rotary joints in one embodiment of the present invention. As shown in FIG. 1, the optical signal transmission system for rotary joints comprises a hollow cylindrical rotor 105, a hollow cylindrical stator 104 connected with the rotor 105 through a bearing 109, a plurality of sets of photodetectors and conditioning circuits components 103, including photodetectors and conditioning circuits, arranged on the inner surface of the rotor 105 and the stator 104 respectively, two sets of beam-condensing light paths comprising hollow cones 106 and condenser lens 108, a plurality of optical signal sources 101, two trays (cone holder) 102, two identical beam splitter 107 respectively fixed on the other side of each tray 102 on a side opposite to a side where the light beam path structure is fixed.

The rotor 105 is driven by a driving device which has not been shown in the drawings to rotate in the circumferential direction relative to the stator 104, or the stator may be driven by the driving device to rotate in the circumferential direction relative to the rotor, as long as the stator and the rotor can rotate relatively. In addition, the stator and the rotor do not need to rotate relative to each other.

As shown in FIG. 1, the rotor 105 and the stator 104 are arranged relative to each other in a way that the axis lines are on the same straight line, and both of which are the same in inner diameter, a closed cylindrical space is jointly formed by the inner surfaces of the rotor 105 and the stator 104, and an optical signal transmission space is formed by opposing surfaces of the two trays 102 fixed in the inner space of the rotor 105 and the stator 104 respectively and the inner surfaces of the stator 104 and the rotor 105.

A set of the beam-condensing light path structures are arranged in the center of the side of either tray 102 facing the other tray. Two sets of the beam-condensing light paths have the same structure and are symmetrical about a certain circular cross-section in the optical signal transmission space. The circular cross section is, for example, a cross section perpendicular to the axis of the rotor 105 and the stator 104 and passing through the midpoint of the line segment connecting the centers of the opposing surfaces of the two trays 102. A plurality of the optical signal sources 101 and the beam splitter 107 are arranged at the central position of the tray 102 on the opposite side of the one side provided with the focusing optical path structure. The beam splitter 107 is fixedly connected to either of the trays 102. The number of optical signal sources on the two trays 102 is the same, and they are arranged symmetrically about a certain circular cross-section in the optical signal transmission space. The circular cross section is, for example, a cross section perpendicular to the axis of the rotor 105 and the stator 104 and passing through the midpoint of the line segment connecting the centers of the opposing surfaces of the two trays 102. Optical signals emitted from the light signal sources 101 at the side of either tray 102 are combined into a light beam by the beam splitter 107 arranged at the side of the tray 102, and the light beam passes through a hollow conical body 106 of the beam-focusing optical path structure arranged on the tray 102 and is refracted by the beam-focusing lens 108 to be beamed, thereby a hollow beam is obtained and reaches the corresponding photodetector and conditioning circuit 103. The optical signal is gathered and converted into an electrical signal and amplified by the photodetector and conditioning circuit assembly 103. The photodetector and conditioning circuit assembly 103 comprises a focusing lens, a photoelectric responder integrated detector, a filter at the front end of the focusing lens and an electrical signal conditioning circuit.

The optical signal source 101 comprises a light source, an electro-optical modulator (driver), and a beam collimating/shaping system. The electro-optical modulator is configured to modulate carrier beams emitted from the light source with electrical signal data to be transmitted. The beam collimating/shaping system is configured to collimate modulated beams to reduce the beam divergence angle. The smaller the beam divergence angle is, the better. When the light source is a light emitting diode (LED), LED current modulation is adopted: when the light source is a laser, a common laser modulator is configured for modulation.

The beam splitter 107 is combined with the optical signal source 101, and the beam splitter 107 is fixed to the tray 102 by a connecting mechanism not shown so that the center of the beam splitter 107 is aligned with the center of the bottom surface of the hollow conical body 106 of the focusing optical path structure on the same tray.

The beam splitter 107 is coated with wavelength separation enhancement transmission film and enhanced reflection film, and a plurality of beam splitter 107 can be configured in cascade for multiple reflections, and then a plurality of beams can be combined by means of wavelength separation.

Figure 2:
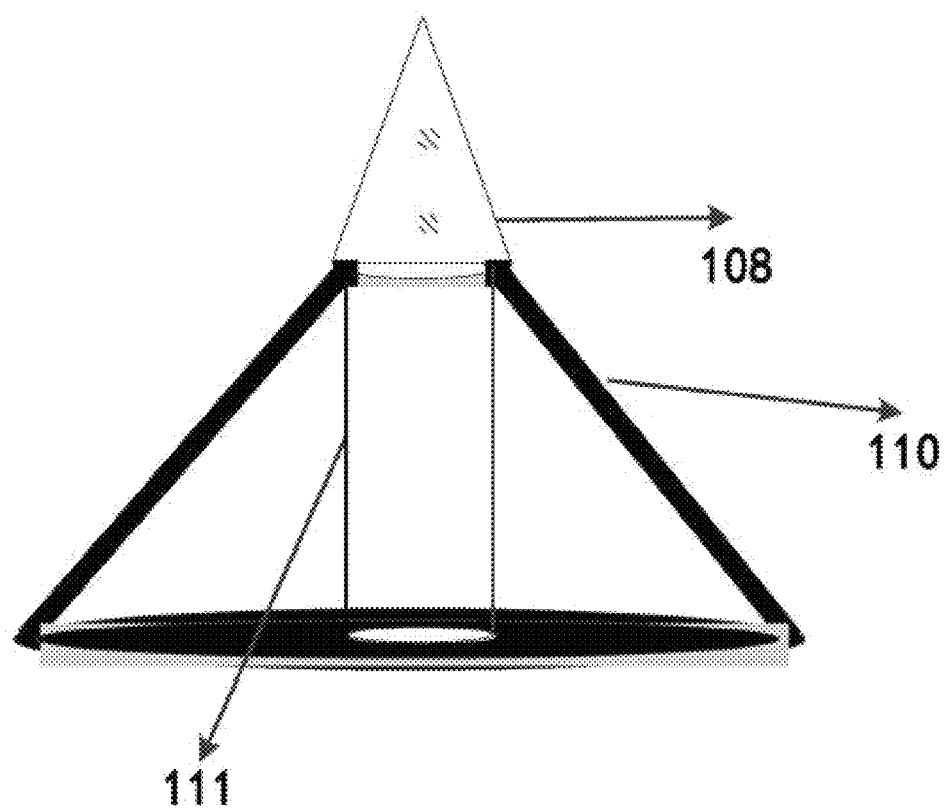
FIG. 2 is a structure diagram of the hollow cone.

As shown in FIG. 2, the hollow cone 106 is a metal structure, which has an outer surface 110 with a high-reflectivity metal coating (e.g. the surface 110 is coated with chrome followed by gold or aluminum after chrome is planed), and an inner surface 111 is blackened to suppress the generation of stray light. The hollow cone 106 is connected to the tray 102 with an opening arranged respectively at its top and bottom, and its central axis and the central axis of the condenser lens 108 fixed on the opening of its top are on the same straight line. The condenser lens 108 is made of BK7 glass, and its surface is coated with an enhancement transmission film. Preferably, the top surface of the hollow cone 106 is glued with the boss on the bottom surface of the condenser lens 108, and then they are connected by a clamping ring. The hollow cone 106 is combined with the condenser lens 108 to achieve separation of beam transmit-receive channels. Light beams from any optical signal source 101 (such as the optical signal source 101 on the lower side in FIG. 1) passes through the hollow conical body 106 from the beam splitter 107 on the corresponding side (for example, the beam splitter 107 on the lower side) and is normally incident on the condenser lens 108. The condenser lens 108 condenses incident beams to a hollow beam in the center and enables more beams to be projected onto the outer surface of the hollow cone 106 on the other tray in the form of light bands of predetermined width, the predetermined width is determined according to the design requirements of the optical signal transmission system of the rotary joints. Due to the wavelength of the light used, the height of the rotor 105 and the axial direction of the stator 104, etc., it is preferable that the light band occupies a small surface area of the outer surface of the hollow conical body 106, and a miniature optical lens with optical processing capability is sufficient.

The condenser lens 108 is configured for condensing incident beams into a hollow beam, and its shape and structure are not limited herein. In one embodiment, the condenser lens 108 is a conical lens, and the range of its half-cone angle $\alpha$ is $\arctan(7/7) < \alpha < \arctan(0/7)$, which is selected based on the actual processing capability of optical aperture and constraints on the physical height of cone angle. According to the collimation degree of the beam collimation/collimation system included in the optical signal source 101, as the diameter of the bottom surface of the converging lens 108 of the conical lens is set to 5 mm, 7 mm and the half-cone angle $\alpha = \arctan(2.5/7)$; the half-cone angle $\beta$, minimum height and minimum basal diameter of the hollow cone 106 is set to $\approx \pi/4 + 0.5 \times \alpha = \pi/4 + 0.5 \times \arctan(2.5/7)$, 4 mm and 12 mm respectively. The angle and dimensions can be reasonably designed based on the beam divergence angle and actual miniature physical dimensions, as well as the angle relationship in the above figure. Furthermore, the condenser lens 108 may not be installed. Diffraction is performed via mm-level hole of hollow cone on any tray to increase beams to be projected onto the outer surface of the hollow cone 106 on the other tray, which will cause an increase in loss of light energy, suitable for power transmission links over short distances, and not suitable for power transmission links over long distances.

The photodetector and conditioning circuits 103 are configured to condense optical signals and convert them into electrical signals for amplification processing. It comprises a focusing lens, an integrated photodetector, a filter at the front end of the focusing lens and an electrical signal conditioning circuit. The band-pass center wavelengths of the band-pass filter (OD>=3) correspond one-to-one with the center wavelengths of light output by the optical signal source.

The optical signal transmission system for rotary joints works as follows: light beams emitted from a plurality of optical signal sources 101 arranged at the side of either tray 102 are combined into one beam of light by the beam splitter 107 at the corresponding side: the combined beam is condensed by the condenser lens 108 to hollow the beam in the center (i.e. hollow light beam), and transmitted to the outer surface of the hollow cone 106 on another tray, reflected, then received by the corresponding photodetector and conditioning circuit 103.

Further, the number of the optical signal sources 101 at the side of either of the trays 102 can be set to one or more, and the number of the optical signal sources 101 at the side of the two trays 102 is the same. Preferably, light beams of different wavelengths are emitted from any two optical signal sources for duplex communication to avoid wavelength interference in the uplink and downlink of the same channel and between different channels. Light beams emitted from the optical signal sources 101 at the side of the same tray 102 are combined into one beam of light by the beam splitter on the tray, and the beam passes through the hollow core of the hollow cone 106 and is normally incident on the condenser lens 108 at the side of the tray 102 and is refracted by the focusing lens 108 to form a hollow beam in the middle. The light beam then reaches the outer surface of the conical body 106 on the side of the other tray 102 after passing through the optical signal transmission space, and is reflected to form a circular light beam and reaches the photodetector and conditioning circuit 103 at the side of the other tray 102, Only a tiny part of the hollow light beam formed by refraction by the focusing lens 108 at the side of one tray 102 reaches the surface of the focusing lens 108 at the side of the other tray 102 after passing through the optical signal transmission space, and enter the inner surface of the hollow cone 106 on the other tray to be absorbed.

According to the optical signal transmission system described in FIG. 1, there are a plurality of optical signal sources 101 at the side of either of the trays 102, which can realize an optical signal transmission system with multiple transceiver channels. The optical signal transmission system with a plurality of transmit-receive channels refers to a plurality of transmitting units and a plurality of receiving units, and the plurality of transmitting units can transmit signals of different wavelengths at the same time or in different time sections, and correspondingly, the plurality of receiving units can receive signals of different wavelengths at the same time or in different time sections. The number of transmitting/receiving units is limited by the internal space of the stator and the rotor. As the photodetectors and conditioning circuits for uplink and downlink can be arranged at different positions in the internal space of the stator/rotor, the wavelengths of light in uplink and downlink can be different or the same when performing duplex optical transmission.

Corresponding to the above-mentioned optical signal transmission system, the present application also provides an optical signal transmission method for rotary joints. The optical signal transmission method adopts the above-mentioned optical signal transmission system, through which signal beams are generated by the optical signal sources in the optical signal transmission system, and the signal beams are sent, transmitted and received between the rotor and the stator.

The above-mentioned embodiments are merely preferred embodiments of the present application, and common variations and substitutions performed by those skilled in the art within the technical proposal of the present applications should be included in the protection scope of the present application.

Compared with the prior art, the technical proposal provided by the present application has following beneficial effects:

(1) The optical signal transmission system for rotary joints provided by the present application is characterized by symmetric uplink and downlink, low optical loss in any direction during duplex information transmission, simple light paths, and no wavelength planning problems, and it can be configured in narrow space for installation of servo mechanisms of rotary joints.

(2) The optical signal transmission system provided by the present application can achieve duplex communication, and the related components in the system can be symmetrically arranged without any excess restrictions on the installation of transmit-receive components in the rotor and stator of rotary joints. In addition, it can be easily expanded into a multi-channel optical signal transmission system.

(3) The system has no optical fiber rotary joint shaft wear and optical fiber coupling problems existing in the prior art, which extends the service life of the optical signal transmission system.

(4) The relative positions of the beam-focusing optical path structure and the photodetector and conditioning circuit assembly arranged on the rotor side are fixed, that is, the beam-focusing optical path structure, photodetector, and conditioning circuit assembly rotate synchronously with the rotation of the rotor, and the light beam reflected by the hollow conical body of the beam-focusing optical path structure is annular, so the photodetector and conditioning circuit assembly can well receive the light beam reflected by the hollow conical body and convert and amplify it.

Industrial Practicality

This application is applied in the field of optical communication, and provides an optical signal transmission system and optical signal transmission method of a rotary joints, which can be easily expanded into an optical signal transmission system for multi-channel

What is claimed is:

1. An optical signal transmission system for rotary joints comprising:
a hollow cylindrical rotor, a hollow cylindrical stator connected with the rotor through a bearing, a plurality of sets of photodetectors and conditioning circuits components arranged on inner surfaces of the rotor and the stator respectively, the rotor and stator each have trays which include a plurality of optical signal sources and a beam splitter along with hollow cones and condenser lenses to provide two sets of identical beam-condensing light paths;
the rotor and the stator are arranged opposite to each other, a closed cylindrical space is formed by the inner surfaces of the two, and an optical signal transmission space is formed by the opposing surfaces of the two trays fixed in the inner space of the rotor and the stator respectively and the cylindrical side walls of the stator and the rotor;
the beam-condensing light paths are arranged in a center of a side of either tray facing the other tray, the two sets of beam-condensing light paths are symmetric about a certain circular cross-section in the optical signal transmission space; the optical signal sources and the beam splitters are arranged at a center of the other surface of the trays on the opposite side to the surface provided with the beam-focusing optical path structure, each of the beam splitters is fixedly connected to the trays, optical signals emitted by the optical signal sources on either tray are combined into a light beam by the beam splitter arranged on the tray, and then the beam is condensed by the condenser lens to obtain a hollow beam which is received by the corresponding photodetector and the corresponding conditioning circuit after being reflected from an outer surface of the hollow cone on the other tray;
wherein each of the hollow cones is a metastructure, which has a metal-coated outer surface with high reflectivity and a blackening-treated inner surface; each of the hollow cones is connected to each of the trays with an opening arranged respectively at its top and bottom, and its central axis and an central axis of each of the condenser lens fixed on the opening of its top are on a same straight line.

2. The optical signal transmission system according to claim 1, wherein each of the optical signal sources comprises a light source, an electro-optical modulator, and a beam collimating/shaping system; the electro-optical modulators are provided to modulate carrier beams emitted by the light sources according to electrical signal data to be transmitted; the beam collimating/shaping systems are provided to collimate modulated beams to reduce the beam divergence angle.

3. The optical signal transmission system according to claim 1, wherein the beam splitter arranged on either of the trays is fixed on the tray, and aligned with an center of the bottom surface of the hollow cone in the beam-condensing light path on either tray.

4. The optical signal transmission system according to claim 1, wherein the photodetectors and conditioning circuits are configured to condense optical signals and convert them into electrical signals for amplification processing; it comprises a focusing lens, an integrated photodetector, a filter at a front end of the focusing lens and an electrical signal conditioning circuit.

5. The optical signal transmission system according to claim 4, wherein a number of the optical signal sources on each of the trays is one or more, the number of the optical signal sources on each of the two trays is the same, and they are symmetrically arranged about a certain circular cross section in the optical signal transmission space; light beams emitted from the optical signal sources on the same tray are combined into one beam of light by the beam splitter on the tray, and the beam is positioned at the hollow core of the hollow cone on the tray and is incident on the focusing lens; after passing through the optical signal transmission space, an outer surface of the hollow cone on the other tray is reflected to form a circular light beam which are received by the photodetectors and conditioning circuits on the other side of the tray.

6. The optical signal transmission system according to claim 5, wherein the optical signal sources emit light beams with different wavelengths.

7. The optical signal transmission system according to claim 5, the optical signal transmission system is an optical signal transmission system with multiple transceiver channels.

8. An optical signal transmission method for a rotary joint, the rotary joint uses the optical signal transmission system according to any of claims 1-2 or 3-7, and the optical signal source of the optical signal transmission system generates a signal beam, the signal beam is sent, transmitted and received between the rotor and the stator.

9. The optical signal transmission system according to claim 6, the optical signal transmission system is an optical signal transmission system with multiple transceiver channels.

\* \* \* \* \*